Patented July 2, 1935

2,006,517

UNITED STATES PATENT OFFICE 2,006,517

METHOD OF PREPARING VINYL PHENOLS

George W. Seymour, Cumberland, Md., assignor to Celanese Corporation of America, a corporation of Delaware No Drawing. Application April 16, 1932, Serial No. 605,790

8 Claims. (Cl. 260—154)

This invention relates to the preparation of vinyl phenols and of synthetic resins formed by the polymerization of the same, and also to coating or plastic compositions containing derivatives of cellulose and particularly organic derivatives of cellulose.

An object of my invention is to prepare vinyl phenols in an expeditious manner.

The preparation of a lacquer containing organic derivatives of cellulose, such as cellulose acetate as the main constituent of the lacquer base, which lacquer is to be applied to a hard, smooth surface presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the film produced from it, both the lacquer and the film produced therefrom become cloudy and unhomogeneous.

I have found that vinyl phenols may be produced by reacting a phenol with a vinyl halide and that synthetic resins produced by the polymerization of such vinyl phenols are compatible with cellulose acetate, and that when added to lacquers containing cellulose acetate they form clear solutions that upon drying produce clear, hard and tough and firmly adherent films.

In accordance with my invention, I prepare vinyl phenols by reacting vinyl halides with phenols. Special synthetic resins may be prepared by the polymerization of such vinyl phenols. These synthetic resins are then used for making a lacquer or plastic composition which contains one or more derivatives of cellulose and a volatile solvent. The lacquer may contain also one or more natural or semi-synthetic resins or gums, one or more plastifiers or softening agents, medium and/or high boiling point solvents and preferably, but not necessarily, some pigments and/or dyes.

Solutions thus formed may be employed as a lacquer or coating composition for metal, glass or other surfaces and may be used for making photographic or other films. Artificial yarns may be formed by extruding the solution containing the derivative of cellulose and the special resin through the orifices of a spinneret, either into a heated evaporative atmosphere as in dry spinning, or into a precipitating bath as in wet spinning. The solution may also be employed as an adhesive, and is particularly useful in this connection for making shatterless glass by causing celluloid sheets to adhere to surfaces of sheets of glass between which they are placed.

The plastic composition containing derivatives of cellulose and the special resin may be worked into sheets which may also be used for laminated glass, and also may be worked into blocks or articles in any known manner.

The derivative of cellulose that may be used for making the solutions for coating or plastic compositions comprises any suitable derivative, such as cellulose nitrate or organic derivatives of cellulose. Examples of organic derivatives of cellulose are organic esters of cellulose such as cellulose acetate, cellulose formate, cellulose propionate and cellulose butyrate or cellulose ethers such as ethyl cellulose, methyl cellulose and benzyl cellulose.

The low boiling point solvent that may be employed may be one or a mixture of two or more of the following: Acetone, alcohol, benzene, ethylene formal or ethylene dichloride. Examples of medium and/or high boiling point solvents are ethyl acetate, ethyl lactate, tetrachlorethane, formal glycerol, benzyl alcohol or diacetone alcohol. Of course it is understood that the choice of the solvents depends on the solubility characteristics of the particular derivative of cellulose employed. Examples of suitable plastifiers are diphenylol propane, triacetin, dibutyl tartrate, diethyl phthalate, dimethyl phthalate, toluene sulfonamid, mono methyl xylene sulfonamide, etc. If desired, fire retardants may be added, particularly the very effective bromine derivatives of organic compounds such as brominated tricresyl phosphate. The pigments or dyes that may be used may be those ordinarily employed in the paint or lacquer industry.

Of the natural gums or resins that may be added, the following may be mentioned: manila, acaroides, pontianak, kauri, dammar, rosin and shellac. The semi-synthetic resin, ester gum, which is the glycerol ester of rosin may be also added. If desired, synthetic resins, other than the special polyvinyl phenol resin may be employed in conjunction therewith, and examples of these are the fusible and soluble phenol-formaldehyde or diphenylol propane-formaldehyde resins preferably prepared in the presence of acid catalysts.

The specific resins made by and employed in this invention are polyvinyl phenols, that is products formed by the polymerization of a vinyl phenol. These vinyl phenols, whether polymerized or unpolymerized, are new compounds.

In making the vinyl phenol I react a phenol with a vinyl halide in the presence of a suitable condensing agent such as anhydrous aluminum chloride, anhydrous ferric chloride or hydrated ferric chloride. The term "a vinyl phenol" includes not only ortho or para vinyl phenol, $CH_2=CH-C_6H_4OH$, but any suitable aromatic compound having one or more hydroxyl groups attached to the nucleus and having a radicle containing the vinyl group, $CH_2:CH$, also attached to the nucleus. These vinyl phenols may be prepared by treating, in the presence of the condensing agent, of a vinyl halide, such as vinyl chloride, vinyl bromide or vinyl iodide with a phenol which includes simple phenol or substituted phenols such as cresols, halogenated phenols and the like.

In order to prepare the special synthetic resins, the simple or unpolymerized vinyl phenol may be polymerized in any suitable manner, such as by exposure to sunlight or ultra violet light, such as is emitted from a mercury vapor lamp or by heating. Catalysts such as uranium salts, benzoyl peroxide, etc., may be employed to assist the polymerization.

The following examples are given as modes of making the simple or unpolymerized vinyl phenol and also of making the synthetic resins by polymerizing such vinyl phenol.

Example A 10 parts by weight of anhydrous aluminum chloride are added to 50 parts by weight of phenol. A violent reaction occurs with the evolution of hydrogen chloride. After this reaction has subsided the mass is heated and maintained at 100° C. and vinyl chloride is run in a slow stream with stirring through the same. After 60 parts by weight of vinyl chloride have been introduced the reaction is stopped. Water is then added to the mixture to hydrolyze the organic aluminum compound, whereupon a dark colored oil which is vinyl phenol is precipitated and this is separated from the supernatant liquor.

In order to form the synethetic resin, the vinyl phenol so formed is then polymerized by exposure to light to form the polymerized vinyl phenol resin.

Example B

The process of Example A is carried out with the exception that either anhydrous ferric chloride or hydrated ferric chloride is used as a condensing agent instead of the anhydrous aluminum chloride. The resin formed in this manner is harder than that formed by the process of Example A.

It is to be understood that the foregoing detailed description is given merely by way of illustration, and that many variations may be made therein, without departing from the spirit of my invention.

Having described my invention, what I claim and desire to secure by Letters Patent is:

1. Method of preparing a vinyl phenol comprising reacting a vinyl halide with a phenol in the presence of an acidic condensing agent.

2. Method of preparing a vinyl phenol comprising reacting a vinyl halide with a phenol in the presence of anhydrous aluminum chloride.

3. Method of preparing a vinyl phenol comprising reacting a vinyl halide with a phenol in the presence of anhydrous ferric chloride.

4. Method of preparing a vinyl phenol comprising reacting a vinyl halide with a phenol in the presence of hydrated ferric chloride.

5. Method of preparing vinyl phenol comprising reacting phenol with vinyl halide in the presence of anhydrous aluminium chloride.

6. Method of preparing vinyl phenol comprising reacting phenol with vinyl halide in the presence of anhydrous ferric chloride.

7. Method of preparing vinyl phenol comprising reacting phenol with vinyl halide in the presence of hydrated ferric chloride.

8. Method of preparing vinyl phenol comprising reacting phenol with vinyl halide in the presence of an acidic condensing agent.

GEORGE W. SEYMOUR.